(12) United States Patent
Luo

(10) Patent No.: US 11,188,582 B2
(45) Date of Patent: Nov. 30, 2021

(54) METHOD FOR RESOURCE SEARCH AND RELATED PRODUCTS

(71) Applicant: Shenzhen HeyTap Technology Corp., Ltd., Guangdong (CN)

(72) Inventor: Yue Luo, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 16/799,596

(22) Filed: Feb. 24, 2020

(65) Prior Publication Data

US 2020/0192923 A1    Jun. 18, 2020

Related U.S. Application Data

(63) Continuation of application No. PCT/CN2017/100084, filed on Aug. 31, 2017.

(51) Int. Cl.
*G06F 16/33* (2019.01)

(52) U.S. Cl.
CPC .................. *G06F 16/3334* (2019.01)

(58) Field of Classification Search
CPC ................................................. G06F 16/3334
See application file for complete search history.

(56) References Cited

U.S. PATENT DOCUMENTS

| 8,612,470 B1 | 12/2013 | Fushman et al. |
| 2011/0106831 A1* | 5/2011 | Zarzar Charur .... G06F 16/3322 707/767 |
| 2013/0325892 A1* | 12/2013 | Edwards ............... G06F 16/951 707/769 |
| 2016/0085521 A1* | 3/2016 | Savliwala ............... H04L 67/42 717/108 |

(Continued)

FOREIGN PATENT DOCUMENTS

| CN | 101984423 A | 3/2011 |
| CN | 103488780 A | 1/2014 |
| CN | 104598511 A | 5/2015 |

(Continued)

OTHER PUBLICATIONS

International search report issued in corresponding international application No. PCT/CN2017/100084 dated May 31, 2018.

(Continued)

*Primary Examiner* — Van H Oberly
(74) *Attorney, Agent, or Firm* — Young Basile Hanlon & MacFarlane, P.C.

(57) ABSTRACT

A method for resource search and related products are provided. The method is applicable to a server and includes the following. A search request is received from a mobile terminal, where the search request includes a target search term. Search for a target search result set from a preset application library according to the target search term. The target search result set is pushed to the mobile terminal and the mobile terminal is instructed to display the target search (Continued)

result set, when the target search result set has a conversion rate greater than a first threshold value, where the target search result set is displayed with preset display contents, and the preset display contents at least include a conversion rate.

18 Claims, 8 Drawing Sheets

(56) References Cited

U.S. PATENT DOCUMENTS

2017/0177713 A1* 6/2017 Smyros ............... G06F 16/338

FOREIGN PATENT DOCUMENTS

| | | |
|---|---|---|
| CN | 105912680 A | 8/2016 |
| CN | 105930376 A | 9/2016 |
| CN | 105938493 A | 9/2016 |
| CN | 106919575 A | 7/2017 |

OTHER PUBLICATIONS

Extended European search report issued in corresponding European application No. 17923369.7 dated Jul. 22, 2020.
Indian Examination Report for IN Application 202017009409 dated Jul. 1, 2021. (6 pages).

* cited by examiner

METHOD FOR RESOURCE SEARCH AND RELATED PRODUCTS

CROSS-REFERENCE TO RELATED APPLICATION(S)

This application is a continuation of International Application No. PCT/CN2017/100084, filed on Aug. 31, 2017, the entire disclosure of which is hereby incorporated by reference.

TECHNICAL FIELD

This disclosure relates to the technical field of Internet, and particularly to a method for resource search and related products.

BACKGROUND

With wide popularity of mobile terminals (mobile phones, tablet computers, etc.), the mobile terminal can support an increasing number of applications and are becoming more powerful. The mobile terminal is also becoming diversified and personalized and has already been an indispensable electronic device in users' life.

At present, the mobile terminal is installed with a variety of applications (APP). Generally, there are various applications in a software store, and users can search for applications that need to be downloaded in the software store.

SUMMARY

According to a first aspect, a method for resource search is provided in implementations. The method is applicable to a server and includes the following. A search request is received from a mobile terminal, where the search request includes a target search term. Search for a target search result set from a preset application library according to the target search term. The target search result set is pushed to the mobile terminal and the mobile terminal is instructed to display the target search result set, when the target search result set has a conversion rate greater than a first threshold value, where the target search result set is displayed with preset display contents, and the preset display contents at least include a conversion rate.

According to a second aspect, a server is provided in implementations. The server includes at least one processor and a computer readable storage. The computer readable storage is coupled to the at least one processor and stores at least one computer executable instruction thereon which, when executed by the at least one processor, causes the at least one processor to execute the method of the first aspect.

According to a third aspect, a non-transitory computer readable storage medium is provided in implementations. The non-transitory computer readable storage medium is configured to store a computer program which, when executed by a processor, causes the processor to execute the method of the first aspect.

BRIEF DESCRIPTION OF DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
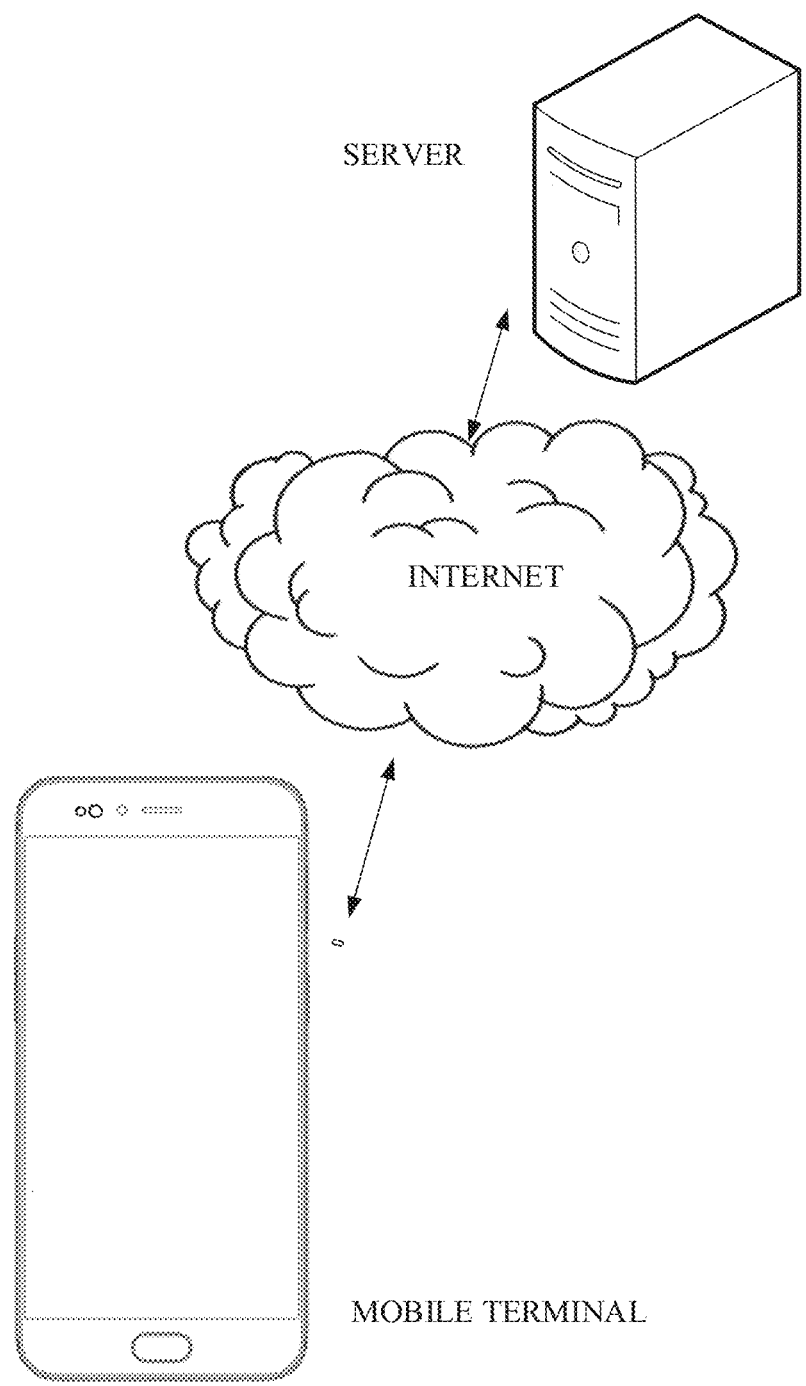
FIG. 1 is a network architecture diagram illustrating a system for resource search according to implementations.

Generally, when searching in a software store, if a search term is entered, a display result(s) will appear. However, when the display result is displayed, display contents of the display result may be too simple. It is not convenient for users to view contents they concern about. Therefore, implementations of the disclosure provide a method for resource search and related products, which can display a conversion rate of each search result, facilitate the users to view each search result, and improve user experience.

In order for those skilled in the art to better understand technical solutions of the present disclosure, in the following, technical solutions of implementations of the present disclosure will be described clearly and completely with reference to accompanying drawings in implementations of the present disclosure. Apparently, implementations described hereinafter are merely some implementations, rather than all implementations, of the present disclosure. All other implementations obtained by those of ordinary skilled in the art based on implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

A mobile terminal in implementations of the disclosure may include various hand-held devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the above-mentioned devices are collectively referred to as the mobile terminal.

The search result of the implementations can be an application resource. The application resource generally includes a download link. The user clicks the download link to download a resource indicated by the application resource. A search result set may include multiple search results, and each search result can correspond to an application resource. The user can download an application corresponding to the application resource. Each search result can correspond to a conversion rate. The conversion rate of the search result can be a ratio of the number of times an application is downloaded to the number of times the application is searched. For example, if an application is downloaded 6 times and the application is searched 10 times, the conversion rate is 60%. The search result set can also correspond to a conversion rate. The conversion rate of the search result set can be an average conversion rate or a maximum conversion rate of first K search results of the search result set, where K is a positive integer. For example, the conversion rate of the search result set can be a conversion rate of an application resource ranking first. The above conversion rate may also be a conversion rate within a specified time period and the specified time period can be set by the user or defaulted by a system.

The search algorithm for implementing searching can be one or a combination of: a pomegranate algorithm, a green dill algorithm developed by Baidu®, a panda algorithm, a penguin algorithm, a neural network algorithm, a genetic algorithm, a support vector machine algorithm, an ant colony algorithm, and so on.

FIG. 1 illustrates a network architecture of a system for resource search configured to implement a method for resource search according to implementations. The network architecture can include a server and a mobile terminal. The server can be a server used for resource search, or a server with a resource search function, and the server can be a cloud server, a local server, or a third-party server. The server is configured to receive a search request from the mobile terminal, where the search request includes a target search term, to search for a target search result set from a preset application library (or a preset application repository) according to the target search term, and to push the target search result set to the mobile terminal when the target search result set has a conversion rate greater than a first threshold value. The mobile terminal is configured to display the target search result set, where the target search result set is displayed with preset display contents, and the preset display contents at least include a conversion rate.

Figure 2:
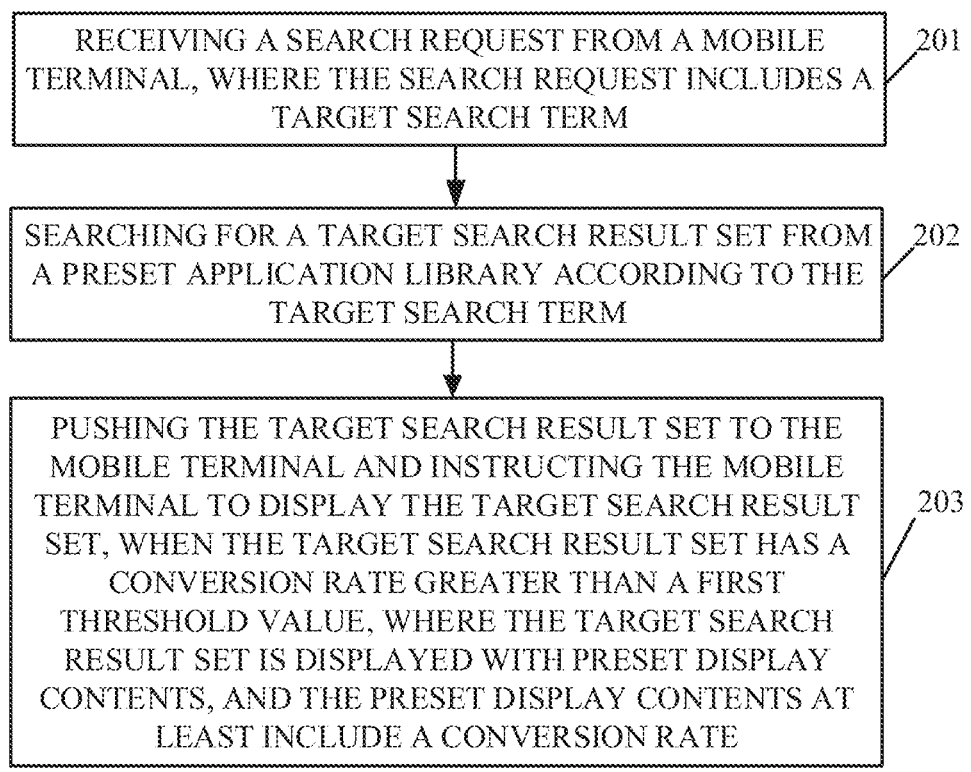
FIG. 2 is a schematic flow chart illustrating a method for resource search according to implementations.

In view of the network architecture of FIG. 1, reference is made to FIG. 2. FIG. 2 is a schematic flow chart illustrating a method for resource search according to implementations. The method for resource search is applicable to the server and begins at 201.

At 201, a search request is received from a mobile terminal, where the search request includes a target search term.

The target search term can be a sentence, or a term or a word, or multiple terms or words. For example, the target search term can be "WeChat", "farmers weeding at noon", or "WeChat oppo", or the like. The implementations can be applied to application download, for example, a software store or an application store. Taking the software store as an example, a target search term can be entered in a search bar of the software store of the mobile terminal, and then a search request containing the target search term can be generated. The server can receive the search request and then search according to the target search term.

At 202, search for a target search result set from a preset application library according to the target search term.

The preset application library can include multiple application resources, and can be set by the server before 201. The server can search for at least one search result corresponding to the target search term from the preset application library based on the target search term and the search algorithm. All search results, or some search results ranking first can form the target search result set.

In at least one implementation, search (202) for the target search result set from the preset application library according to the target search term as follows.

At 21, determine associated terms corresponding to the target search term, and obtain a search term set according to the target search term and the associated terms.

At 22, search for the target search result set from the preset application library according to the search term set.

The associated terms can include a synonym, a related term, and an antonym of the target search term. The related term of the target search term refers to a term(s) that has relation with the target search term in structure and/or meaning. The search term set is obtained according to the target search term and the associated terms. Thereafter, the preset application library is searched according to the search term set, to obtain the target search result set.

In at least one implementation, determine (21) the associated terms corresponding to the target search term, and obtain (21) the search term set according to the target search term and the associated terms as follows.

Determine a synonym, a related term, and an antonym corresponding to the target search term. Obtain the search term set according to the target search term and the synonym, the related term, and the antonym corresponding to the target search term.

The server can parse the target search term to obtain a keyword(s). The keyword can be a letter or a word. According to a preset mapping relationship between keywords and associated words, determine associated words corresponding to the keywords parsed from the target search term, that is, determine the synonym, the related term, and antonym corresponding to the target search term. The search term set is obtained according to the target search term and associated words.

Determine the synonym, the related term, and the antonym corresponding to the target search term as follows.

The target search term is parsed to obtain at least one keyword. A synonym, a related term, and an antonym corresponding to the at least one keyword are determined according to a preset keyword library. The synonym, the related term, and the antonym corresponding to the at least one keyword are determined as the synonym, the related term, and the antonym corresponding to the target search term.

The preset keyword library can be set before 201, and the preset keyword library records different keywords and synonyms, related words, and antonyms corresponding to the different keywords. The target search term can be parsed through word splitting or semantic parsing to obtain the at least one keyword. The synonym, the related term, and the antonym corresponding to the at least one keyword are determined according to the preset keyword library. The synonym, the related term, and the antonym corresponding to the at least one keyword are then determined as the synonym, the related term, and the antonym corresponding to the target search term.

Search (22) for the target search result set from the preset application library according to the search term set as follows.

At 221, search, according to the target search term and the synonym and the related term corresponding to the target search term, the preset application library, to obtain a first search result set.

At 222, search, according to the antonym corresponding to the target search term, the preset application library, to obtain a second search result set.

At 223, determine an intersection between the first search result set and the second search result set as a third search result set.

At 224, determine the target search result set by subtracting the third search result set from the first search result set.

The server can search for the first search result set from the preset application library according to the target search term and the synonym and the related term corresponding to the target search term. The first search result set can include multiple search results. The server can further search for the second search result set from the preset application library according to the antonym corresponding to the target search term. The second search result set can include multiple search results. Thereafter, the server can determine the intersection between the first search result set and the second search result set as the third search result set. The target search result set is then determined by subtracting the third search result set from the first search result set. During search, search results searched according to the antonym corresponding to the target search term are not reliable, and thus these search results will not be considered. In this way, the number of search results included in the target search result set can be reduced and the user can quickly find an application resource he/she needed.

At 203, the target search result set is pushed to the mobile terminal and the mobile terminal is instructed to display the target search result set, when the target search result set has a conversion rate greater than a first threshold value, where the target search result set is displayed with preset display contents, and the preset display contents at least include a conversion rate.

The first threshold value can be set by the user or by default by the system. The preset display contents can include a conversion rate. When the target search result set has the conversion rate greater than the first threshold value, the server pushes the target search result set to the mobile terminal and instructs the mobile terminal to display the target search result set, where the target search result set is displayed with the preset display contents, and the preset display contents at least include a conversion rate. The above conversion rate can also be understood as: the number of downloads and/or the number of searches of an application.

In at least one implementation, the preset display contents further include at least an application icon, a version number, the number of downloads, or an overview of each search result.

In at least one implementation, the conversion rate of the target search result set is an average conversion rate or a maximum conversion rate of first K search results of the target search result set, where K is a positive integer.

The target search result set is pushed (203) to the mobile terminal and the mobile terminal is instructed (203) to display the target search result set as follows.

At 31, select, from the target search result set, P search results each having a conversion rate greater than a second threshold value, where P is a positive integer.

At 32, acquire a download record of a user corresponding to the mobile terminal.

At 33, determine, according to the download record, preference of the user for application types, to obtain Q preference values.

At 34, determine, for each of the P search results, a score according to the Q preference values and the conversion rate of each of the P search results, to obtain P scores.

At 35, determine, for the P search results, a display order according to the P scores.

At 36, push the display order and the P search results to the mobile terminal, and instruct the mobile terminal to display the P search results, where the P search results are displayed with the preset display contents and the display order.

Figure 2A:
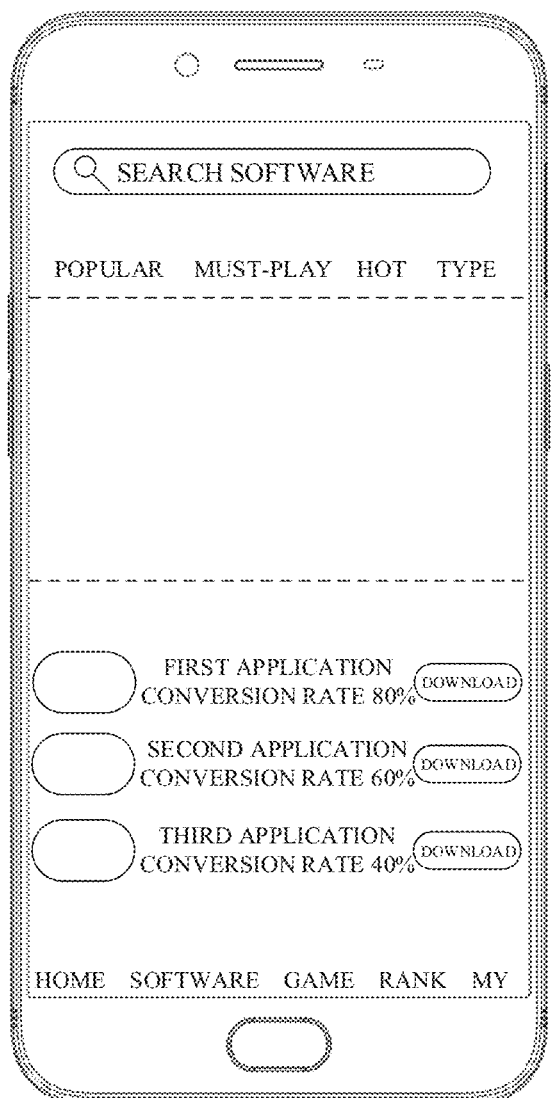
FIG. 2A is a diagram illustrating a display interface of application resources according to implementations.

The second threshold value can be set by the user or by default by the system. If the target search result set has a large number of search results, it is not convenient for the user to choose. Therefore, a part of search results are selected to be provided to the user. For example, search results having higher conversion rate can be selected first. The P search results each having the conversion rate greater than the second threshold value are selected from the target search result set, where P is a positive integer. The download record of the user corresponding to the mobile terminal is further acquired. Since different users have different preference for application types, preference values corresponding to different application types are determined according to the download record. The application types can include, but are not limited to chat applications, social applications, gaming applications, financial applications, etc. The statistics of the number of downloaded application resources corresponding to each application type can be done according to the download record, then a ratio of the number of the downloaded application resources corresponding to each application type to the total number of downloaded application resources can be determined. The ratio is determined as the preference value. The Q preference values are then obtained. Furthermore, the score of each of the P search results is determined according to the Q preference values and the conversion rate of each of the P search results, to obtain P scores. For example, the score=the preference value*the conversion rate. In detail, if a certain application resource has a preference value of 0.2 and a conversion rate of 0.8, a score of this application=0.2*0.8=0.16. In addition, the display order of the P search results is determined according to the P scores. In an example, a search result having a higher score can be displayed first. The display order and the P search results are pushed to the mobile terminal, and the mobile terminal is instructed to display the P search results, where the P search results are displayed with the preset display contents and the display order. For example, as illustrated in FIG. 2A, a first application, a second application, and a third application are illustrated as an example, where the first application has a conversion rate of 80%, the second application has a conversion rate of 50%, and the third application has a conversion rate of 40%. The first application, the second application, and the third application are displayed on the display page in a descending order of the conversion rate.

According to the implementations of the method for resource search, the server can receive the search request from the mobile terminal, where the search request includes the target search term, can search for the target search result set from the preset application library according to the target search term, and can push the target search result set to the mobile terminal and instruct the mobile terminal to display the target search result set when the target search result set has the conversion rate greater than the first threshold value, where the target search result set is displayed with the preset display contents, and the preset display contents at least include a conversion rate. Therefore, when the conversion rate of the target search result set is greater than a certain threshold, the conversion rate of each search result (i.e., application resource) can be displayed, so that the user can better understand the user experience on the application resources and the user experience can be improved.

Figure 3:
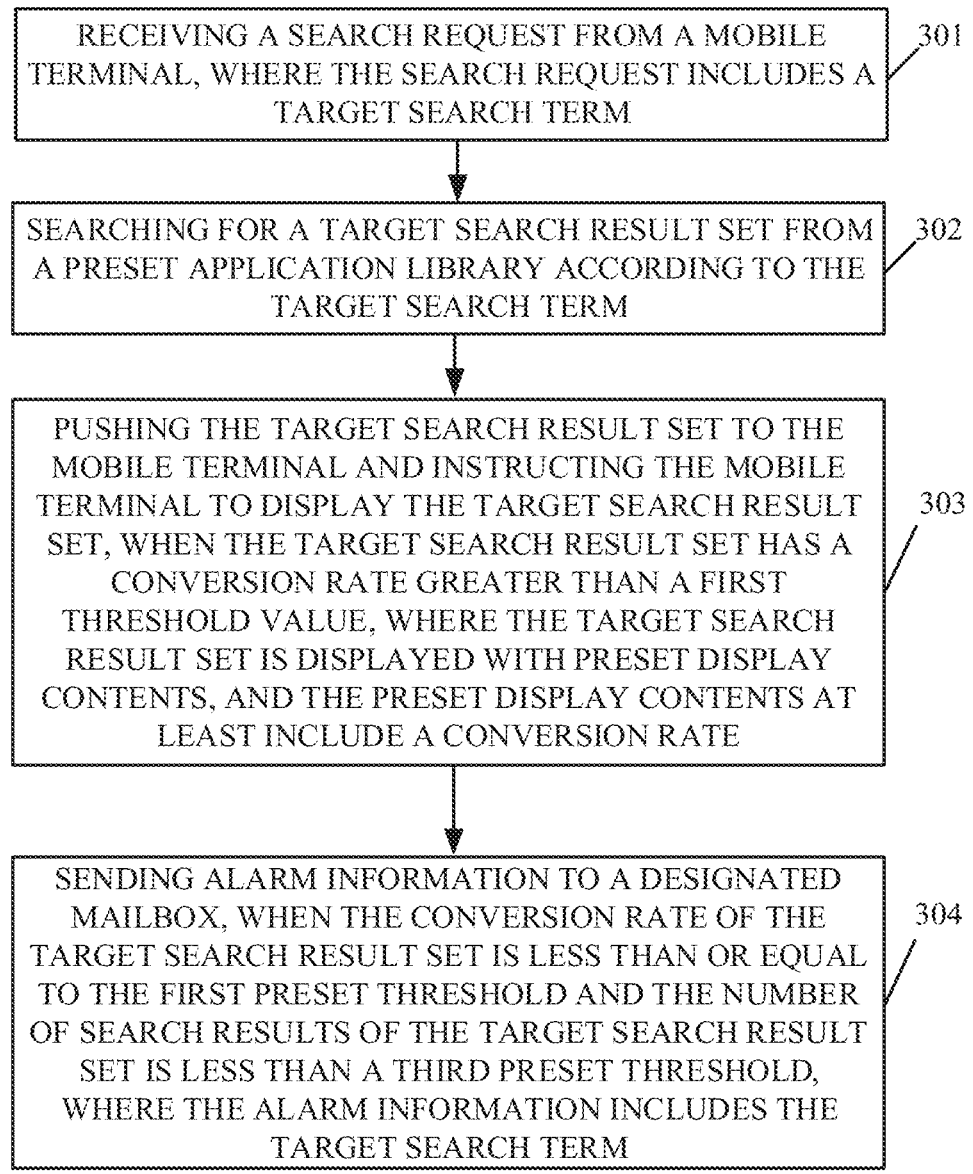
FIG. 3 is a schematic flow chart illustrating a method for resource search according to other implementations.

FIG. 3 is a schematic flow chart illustrating a method for resource search according to implementations. The method for resource search begins at 301.

At 301, a search request is received from a mobile terminal, where the search request includes a target search term.

At 302, search for a target search result set from a preset application library according to the target search term.

At 303, the target search result set is pushed to the mobile terminal and the mobile terminal is instructed to display the target search result set, when the target search result set has a conversion rate greater than a first threshold value, where the target search result set is displayed with preset display contents, and the preset display contents at least include a conversion rate.

For the detailed description of the foregoing operations 301 to 303, reference may be made to the corresponding operations of the method for resource search described in FIG. 2, and details are not described herein again.

At 304, alarm information is sent to a designated mailbox, when the conversion rate of the target search result set is less than or equal to the first preset threshold and the number of search results of the target search result set is less than a third preset threshold, where the alarm information includes the target search term.

The third threshold value can be set by the user or by default by the system. The designated mailbox can be set by an administrator at the server side. The alarm information is used to remind association or extension of the target search term, so that application resources required by the user can be quickly found through the target search term. The server can send the alarm information to the designated mailbox, when the conversion rate of the target search result set is less than or equal to the first preset threshold and the number of the search results of the target search result set is less than the third preset threshold, where the alarm information includes the target search term.

According to the implementations of the method for resource search, the server can receive the search request from the mobile terminal, where the search request includes the target search term, can search for the target search result set from the preset application library according to the target search term, can push the target search result set to the mobile terminal and instruct the mobile terminal to display the target search result set when the target search result set has the conversion rate greater than the first threshold value, where the target search result set is displayed with the preset display contents, and the preset display contents at least include a conversion rate, and can send the alarm information including the target search term to the designated mailbox when the conversion rate of the target search result set is less than or equal to the first preset threshold and the number of the search results of the target search result set is less than the third preset threshold. Therefore, when the conversion rate of the target search result set is greater than a certain threshold, the conversion rate of each search result (i.e., application resource) can be displayed, and the administrator at the server side can be reminded to perfect the target search term, so that application resources required by the user can be quickly found through the target search term and the user experience about the application resources can be better understood, and the user experience can be improved.

Figure 4:
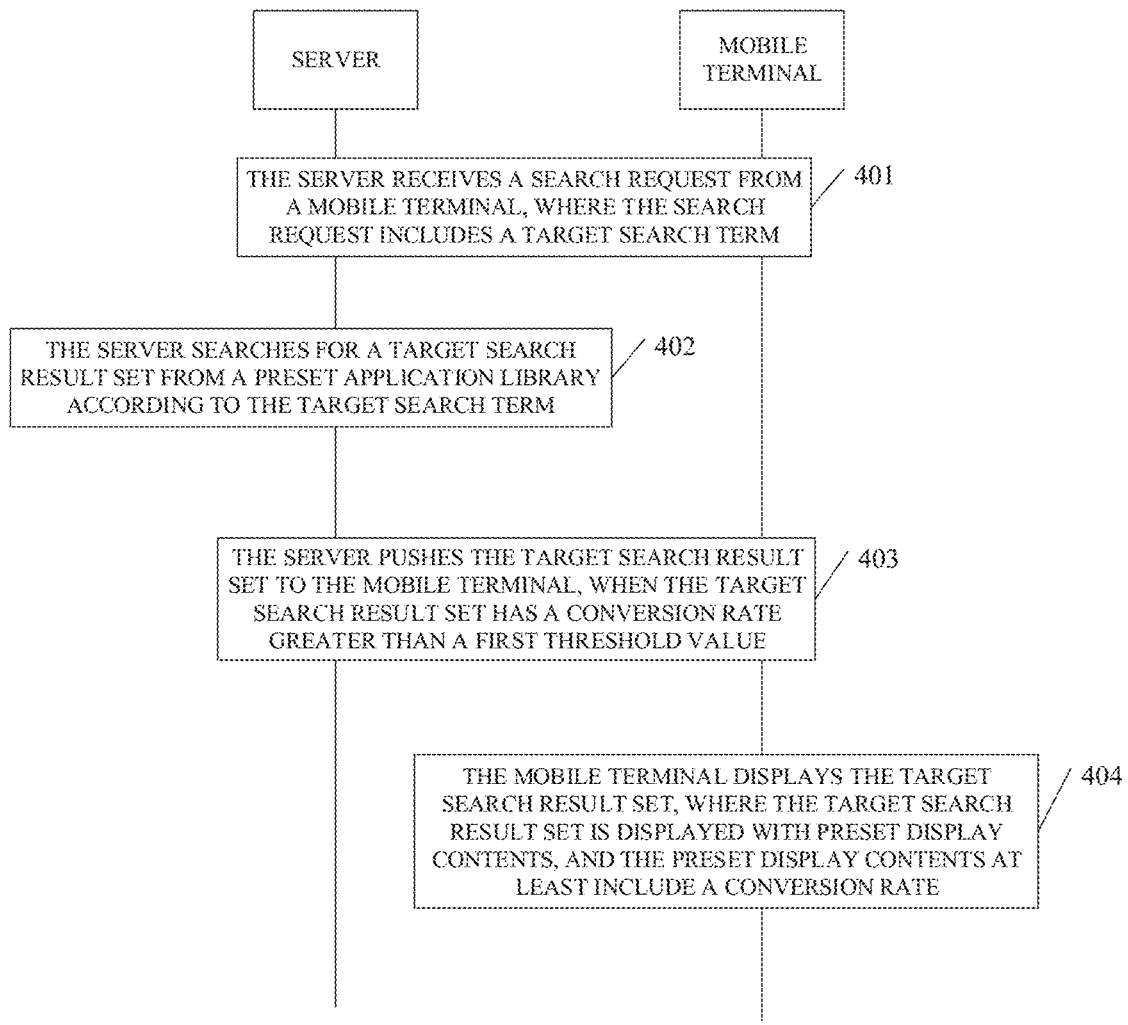
FIG. 4 is a schematic flow chart illustrating a method for resource search according to other implementations.

FIG. 4 is a schematic flow chart illustrating a method for resource search according to implementations. The method for resource search begins at 401.

At 401, a server receives a search request from a mobile terminal, where the search request includes a target search term.

At 402, the server searches for a target search result set from a preset application library according to the target search term.

At 403, the server pushes the target search result set to the mobile terminal, when the target search result set has a conversion rate greater than a first threshold value.

At 404, the mobile terminal displays the target search result set, where the target search result set is displayed with preset display contents, and the preset display contents at least include a conversion rate.

For the detailed description of the foregoing operations 401 to 403, reference may be made to the corresponding operations of the method for resource search described in FIG. 2, and details are not described herein again.

According to the implementations of the method for resource search, the server can receive the search request from the mobile terminal, where the search request includes the target search term, can search for the target search result set from the preset application library according to the target search term, and can push the target search result set to the mobile terminal and instruct the mobile terminal to display the target search result set when the target search result set has the conversion rate greater than the first threshold value, where the target search result set is displayed with the preset display contents, and the preset display contents at least include a conversion rate. In this way, when the conversion rate of the target search result set is greater than a certain threshold, the conversion rate of each search result (i.e., application resource) can be displayed, so that the user can better understand the user experience on the application resources and the user experience can be improved.

Figure 5A:
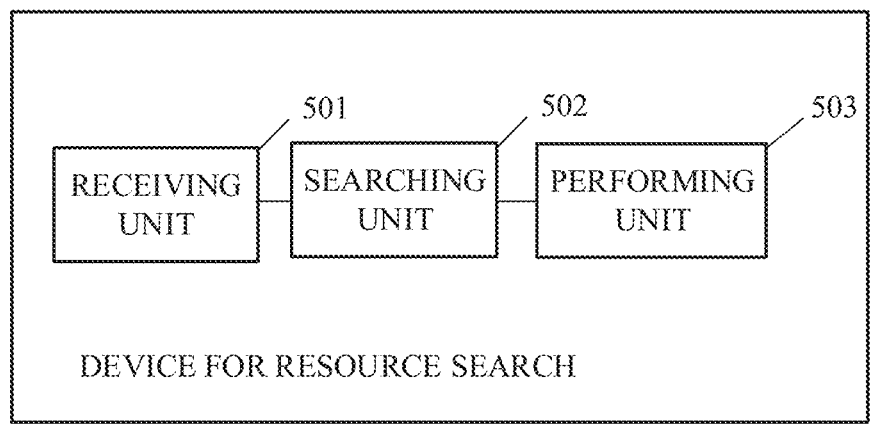
FIG. 5A is a schematic structural diagram illustrating a device for resource search according to implementations.

FIG. 5A is a schematic structural diagram illustrating a device for resource search according to implementations. The device is applicable to a server. The device includes a receiving unit 501, a searching unit 502, and a performing unit 503.

The receiving unit 501 is configured to receive a search request from a mobile terminal, where the search request includes a target search term.

The searching unit 502 is configured to search for a target search result set from a preset application library according to the target search term.

The performing unit 503 is configured to push the target search result set to the mobile terminal and instruct the mobile terminal to display the target search result set, when the target search result set has a conversion rate greater than a first threshold value, where the target search result set is displayed with preset display contents, and the preset display contents at least include a conversion rate.

Figure 5B:
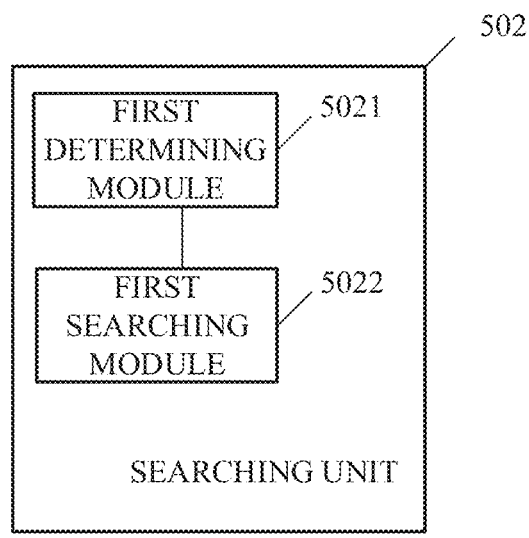
FIG. 5B is a schematic structural diagram illustrating a searching unit of the device for resource search of FIG. 5A according to implementations.

FIG. 5B is a schematic structural diagram illustrating the searching unit 502 of the device for resource search of FIG. 5A according to implementations. The searching unit 502 includes a first determining module 5021 and a first searching module 5022.

The first determining module 5021 is configure to determine associated terms corresponding to the target search term, and obtain a search term set according to the target search term and the associated terms.

The first searching module 5022 is configured to search for the target search result set from the preset application library according to the search term set.

In at least one implementation, the first determining module 5021 is configured to determine a synonym, a related term, and an antonym corresponding to the target search term, and configured to obtain the search term set according to the target search term and the synonym, the related term, and the antonym corresponding to the target search term.

In at least one implementation, the first determining module 5021 configured to determine the synonym, the related term, and the antonym corresponding to the target search term is configured to: parse the target search term to obtain at least one keyword, determine, according to a preset keyword library, a synonym, a related term, and an antonym corresponding to the at least one keyword, and determine the synonym, the related term, and the antonym corresponding to the at least one keyword as the synonym, the related term, and the antonym corresponding to the target search term.

Figure 5C:
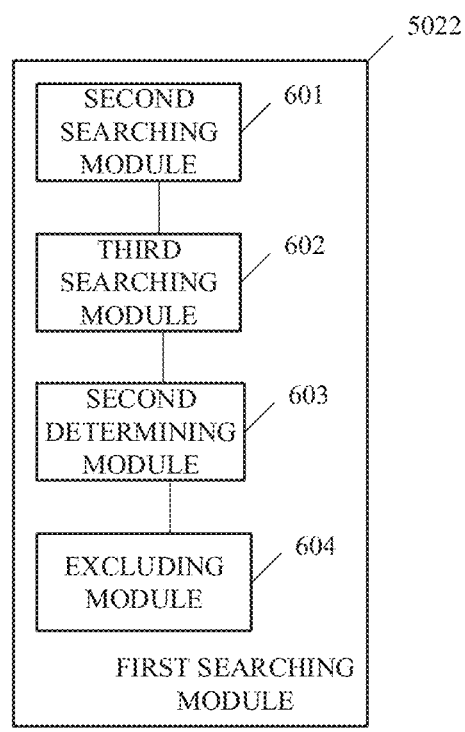
FIG. 5C is a schematic structural diagram illustrating a first searching module of the searching unit of FIG. 5B according to implementations.

FIG. 5C is a schematic structural diagram illustrating the first searching module 5022 of the searching unit 502 of FIG. 5B according to implementations. The first searching module 5022 can include a second searching module 601, a third searching module 602, a second determining module 603, and an excluding module 604.

The second searching module 601 is configured to retrieve, according to the target search term and the synonym and the related term corresponding to the target search term, the preset application library, to obtain a first search result set.

The third searching module 602 is configured to search, according to the antonym corresponding to the target search term, the preset application library, to obtain a second search result set.

The second determining module 603 is configured to determine an intersection between the first search result set and the second search result set as a third search result set.

The excluding module 604 is configured to determine the target search result set by excluding a search result(s) belonging to the third search result set from the first search result set.

Figure 5D:
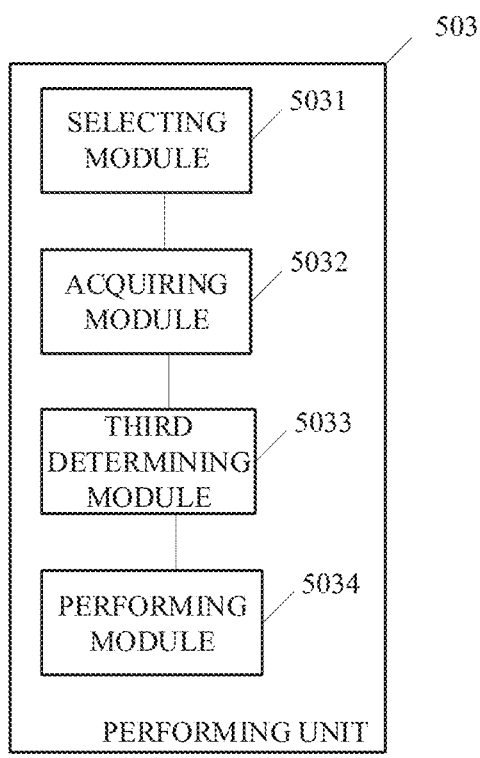
FIG. 5D is a schematic structural diagram illustrating a performing unit of the device for resource search of FIG. 5A according to implementations.

FIG. 5D is a schematic structural diagram illustrating the performing unit 503 of the device for resource search of FIG. 5A according to implementations. The performing unit 503 can include a selecting module 5031, an acquiring module 5032, a third determining module 5033, and a performing module 5034.

The selecting module 5031 is configured to select, from the target search result set, P search results each having a conversion rate greater than a second threshold value, where P is a positive integer.

The acquiring module 5032 is configured to acquire a download record of a user corresponding to the mobile terminal.

The third determining module 5033 is configured to determine, according to the download record, preference of the user for application types to obtain Q preference values, to determine, for each of the P search results, a score according to the Q preference values and the conversion rate of each of the P search results, to obtain P scores, and to determine, for the P search results, a display order according to the P scores.

The performing module 5034 is configured to push the display order and the P search results to the mobile terminal, and instruct the mobile terminal to display the P search results, where the P search results are displayed in the preset display contents and the display order.

Figure 5E:
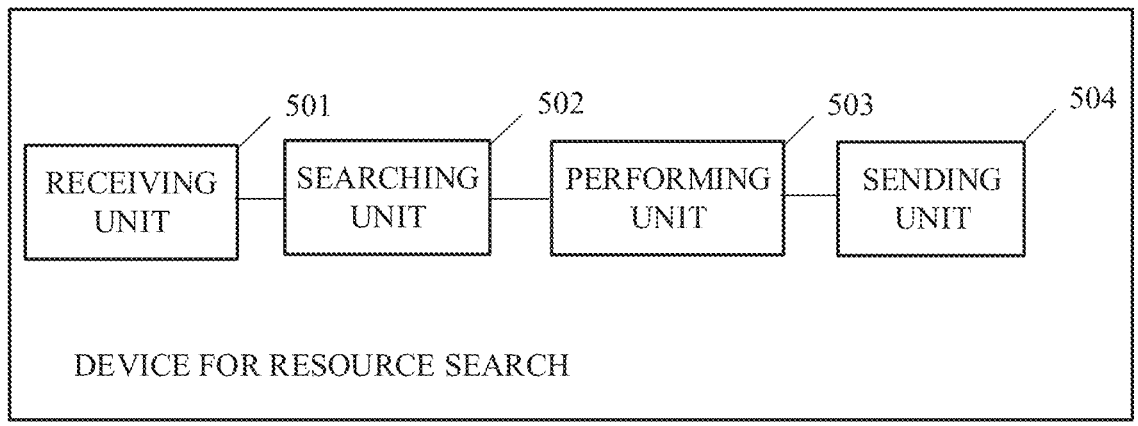
FIG. 5E is a schematic structural diagram illustrating a device for resource search according to other implementations.

FIG. 5E is a schematic structural diagram illustrating a variation of the device for resource search of FIG. 5A according to implementations. The device can further include a sending unit 504.

The sending unit 504 is configured to send alarm information to a designated mailbox, when the conversion rate of the target search result set is less than or equal to the first preset threshold and the number of search results of the target search result set is less than a third preset threshold, where the alarm information includes the target search term.

In at least one implementation, the preset display contents further include at least an application icon, a version number, the number of downloads, or an overview of each search result.

In at least one implementation, the conversion rate of the target search result set is an average conversion rate or a maximum conversion rate of first K search results of the target search result set, where K is a positive integer.

According to the implementations, the device can receive the search request including the target search term from the mobile terminal. The device can search for the target search result set from the preset application library according to the target search term. The device can push the target search result set to the mobile terminal and instruct the mobile terminal to display the target search result set when the target search result set has the conversion rate greater than the first threshold value, where the target search result set is displayed with the preset display contents, and the preset display contents at least include a conversion rate. Therefore, when the conversion rate of the target search result set is greater than a certain threshold, the conversion rate of each search result (i.e., application resource) can be displayed, so that the user can better know the user experience on the application resources and the user experience can be improved.

It is to be noted that, the mobile terminal described in the device implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chip set) and a memory for executing one or more software or firmware programs, a combinational logic circuit, and/or other suitable components that can achieve the above described functions.

Figure 6:
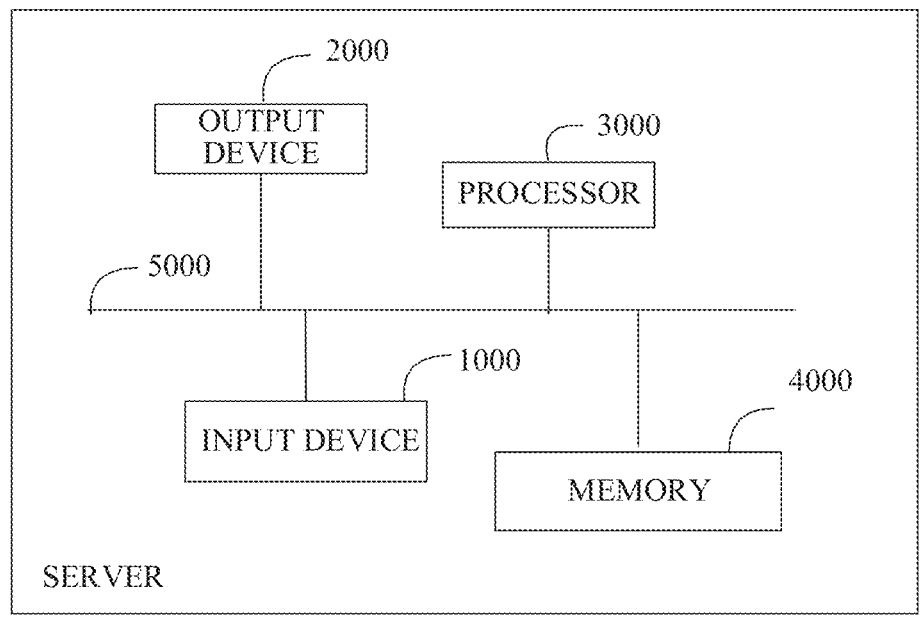
FIG. 6 is a schematic structural diagram illustrating a server according to implementations.

For example, the function of the receiving unit 501 for receiving the search request including the target search term from the mobile terminal can be implemented by the server illustrated in FIG. 6. In an example, a processor 3000 invokes executable program codes in a memory 4000 to receive the search request including the target search term from the mobile terminal.

FIG. 6 is a schematic structural diagram illustrating a server according to implementations. The server includes at least one input device 1000, at least one output device 2000, at least one processor 3000, such as a central processing unit (CPU), and a memory 4000. The at least one input device 1000, the at least one output device 2000, the at least one processor 3000, and the memory 4000 are connected through a bus 5000.

The at least one input device 1000 can be a touch panel, a physical button, or a mouse.

The at least one output device 2000 can be a display screen.

The memory 4000 can be a high-speed random access memory (RAM) memory or a non-volatile memory, such as a magnetic disk memory. The memory 4000 is configured to store program codes, and the at least one input device 1000, the at least one output device 2000, and the at least one processor 3000 are configured to invoke the program codes stored in the memory 4000 to perform the following operations.

A search request is received from a mobile terminal, where the search request includes a target search term. Search for a target search result set from a preset application library according to the target search term. The target search result set is pushed to the mobile terminal and the mobile terminal is instructed to display the target search result set, when the target search result set has a conversion rate greater than a first threshold value, where the target search result set is displayed with the preset display contents, and the preset display contents at least include a conversion rate.

In an example, in terms of searching for the target search result set from the preset application library according to the target search term, the processor 3000 is configured to invoke the program codes to perform the following operations.

Determine associated terms corresponding to the target search term, and obtain a search term set according to the target search term and the associated terms. Search for the target search result set from the preset application library according to the search term set.

In an example, in terms of determining the associated terms corresponding to the target search term, and obtaining the search term set according to the target search term and the associated terms, the processor 3000 is configured to invoke the program codes to perform the following operations.

Determine a synonym, a related term, and an antonym corresponding to the target search term. Obtain the search term set according to the target search term and the synonym, the related term, and the antonym corresponding to the target search term.

In an example, in terms of determining the synonym, the related term, and the antonym corresponding to the target search term, the processor 3000 is configured to invoke the program codes to perform the following operations.

The target search term is parsed to obtain at least one keyword. A synonym, a related term, and an antonym corresponding to the at least one keyword are determined according to a preset keyword library. The synonym, the related term, and the antonym corresponding to the at least one keyword are determined as the synonym, the related term, and the antonym corresponding to the target search term.

In an example, in terms of searching for the target search result set from the preset application library according to the search term set, the processor 3000 is configured to invoke the program codes to perform the following operations.

Search for a first search result set from the preset application library, according to the target search term and the synonym and the related term corresponding to the target search term. Search for a second search result set from the preset application library, according to the antonym corresponding to the target search term. Determine an intersection between the first search result set and the second search result set as a third search result set. Determine the target search result set by subtracting the third search result set from the first search result set.

In an example, in terms of pushing the target search result set to the mobile terminal and instructing the mobile terminal to display the target search result set, the processor 3000 is configured to invoke the program codes to perform the following operations.

Select, from the target search result set, P search results each having a conversion rate greater than a second threshold value, where P is a positive integer. Acquire a download record of a user corresponding to the mobile terminal. Determine, according to the download record, preference of the user for application types, to obtain Q preference values. Determine, for each of the P search results, a score according to the Q preference values and the conversion rate of each of the P search results, to obtain P scores. Determine, for the P search results, a display order according to the P scores. Push the display order and the P search results to the mobile terminal, and instruct the mobile terminal to display the P search results, where the P search results are displayed with the preset display contents and the display order.

In an example, the processor 3000 is further configured to invoke the program codes to perform the following operations.

Alarm information is sent to a designated mailbox, when the conversion rate of the target search result set is less than or equal to the first preset threshold and the number of search results of the target search result set is less than a third preset threshold, where the alarm information includes the target search term.

In an example, the preset display contents further include at least an application icon, a version number, the number of downloads, or an overview of each search result.

In an example, the conversion rate of the target search result set is an average conversion rate or a maximum conversion rate of first K search results of the target search result set, where K is a positive integer.

Implementations of the present disclosure further provide a computer readable storage medium. The computer readable storage medium is configured to store computer programs for electronic data interchange. The computer programs are operable with a computer to execute part of or all the operations of any of the methods for resource research described in the above method implementations.

Implementations of the present disclosure further provide a computer program product. The computer program product includes a non-transitory computer readable storage medium that stores computer programs. The computer programs are operable with a computer to execute part of or all the operations of any of the methods for resource research described in the above method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it is to be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software program module.

The integrated unit may be stored in a computer-readable memory when it is implemented in the form of a software program module and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skilled in the art that all or part of the operations of the various methods of the implementations described above may be accomplished by means of a program to instruct associated hardware, the program may be stored in a computer-readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for resource search, the method being applicable to a server and the method comprising:
    receiving a search request from a mobile terminal, wherein the search request comprises a target search term;
    searching for a target search result set from a preset application library according to the target search term;
    selecting, from the target search result set, P search results each having a conversion rate greater than a second threshold value, when the target search result set has a conversion rate greater than a first threshold value, wherein P is a positive integer;
    acquiring a download record of a user corresponding to the mobile terminal;
    determining, according to the download record, preference of the user for application types, to obtain Q preference values, wherein the preference value is a ratio of a number of downloaded application resources corresponding to each application type to a total number of downloaded application resources;
    determining, for each of the P search results, a score according to the Q preference values and the conversion rate of each of the P search results, to obtain P scores, wherein the conversion rate of each of the P search results is a ratio of a number of times an application resource corresponding to the search result is downloaded to a number of times the application resource is searched;
    determining, for the P search results, a display order according to the P scores; and
    pushing the display order and the P search results to the mobile terminal and instructing the mobile terminal to display the P search results, wherein the P search results are displayed with preset display contents and the display order, and wherein the preset display contents at least comprise a conversion rate.

2. The method of claim 1, wherein searching for the target search result set from the preset application library according to the target search term comprises:
    determining associated terms corresponding to the target search term, and obtaining a search term set according to the target search term and the associated terms; and
    searching for the target search result set from the preset application library according to the search term set.

3. The method of claim 2, wherein determining the associated terms corresponding to the target search term, and obtaining the search term set according to the target search term and the associated terms comprises:
    determining a synonym, a related term, and an antonym corresponding to the target search term; and
    obtaining the search term set according to the target search term and the synonym, the related term, and the antonym corresponding to the target search term.

4. The method of claim 3, wherein determining the synonym, the related term, and the antonym corresponding to the target search term comprises:
parsing the target search term to obtain at least one keyword;
determining, according to a preset keyword library, a synonym, a related term, and an antonym corresponding to the at least one keyword; and
determining the synonym, the related term, and the antonym corresponding to the at least one keyword as the synonym, the related term, and the antonym corresponding to the target search term.

5. The method of claim 3, wherein searching for the target search result set from the preset application library according to the search term set comprises:
searching, according to the target search term and the synonym and the related term corresponding to the target search term, the preset application library, to obtain a first search result set;
searching, according to the antonym corresponding to the target search term, the preset application library, to obtain a second search result set;
determining an intersection between the first search result set and the second search result set as a third search result set; and
determining the target search result set by subtracting the third search result set from the first search result set.

6. The method of claim 1, further comprising:
sending alarm information to a designated mailbox, when the conversion rate of the target search result set is less than or equal to the first preset threshold and a number of search results of the target search result set is less than a third preset threshold, wherein the alarm information comprises the target search term.

7. The method of claim 1, wherein the preset display contents further comprise at least an application icon, a version number, the number of downloads, or an overview of each search result.

8. The method of claim 1, wherein the conversion rate of the target search result set is an average conversion rate or a maximum conversion rate of first K search results of the target search result set, wherein K is a positive integer.

9. A server, comprising:
at least one processor; and
a computer readable storage, coupled to the at least one processor and storing at least one computer executable instruction thereon which, when executed by the at least one processor, causes the at least one processor to:
receive a search request from a mobile terminal, wherein the search request comprises a target search term;
search for a target search result set from a preset application library according to the target search term;
select, from the target search result set, P search results each having a conversion rate greater than a second threshold value, when the target search result set has a conversion rate greater than a first threshold value, wherein P is a positive integer;
acquire a download record of a user corresponding to the mobile terminal;
determine, according to the download record, preference of the user for application types to obtain Q preference values, to determine, for each of the P search results, a score according to the Q preference values and the conversion rate of each of the P search results, to obtain P scores, and to determine, for the P search results, a display order according to the P scores; and
push the display order and the P search results to the mobile terminal and instruct the mobile terminal to display the P search results, wherein the P search results are displayed with preset display contents and the display order, and wherein the preset display contents at least comprise a conversion rate.

10. The server of claim 9, wherein the at least one processor configured to search for the target search result set from the preset application library according to the target search term is configured to:
determine associated terms corresponding to the target search term, and obtain a search term set according to the target search term and the associated terms; and
search for the target search result set from the preset application library according to the search term set.

11. The server of claim 10, wherein the at least one processor configured to determine the associated terms corresponding to the target search term, and obtain the search term set according to the target search term and the associated terms is configured to:
determine a synonym, a related term, and an antonym corresponding to the target search term; and
obtain the search term set according to the target search term and the synonym, the related term, and the antonym corresponding to the target search term.

12. The server of claim 11, wherein the at least one processor configured to determine the synonym, the related term, and the antonym corresponding to the target search term is configured to:
parse the target search term to obtain at least one keyword;
determine, according to a preset keyword library, a synonym, a related term, and an antonym corresponding to the at least one keyword; and
determine the synonym, the related term, and the antonym corresponding to the at least one keyword as the synonym, the related term, and the antonym corresponding to the target search term.

13. The server of claim 11, wherein the at least one processor configured to search for the target search result set from the preset application library according to the search term set is configured to:
search, according to the target search term and the synonym and the related term corresponding to the target search term, the preset application library, to obtain a first search result set;
search, according to the antonym corresponding to the target search term, the preset application library, to obtain a second search result set;
determine an intersection between the first search result set and the second search result set as a third search result set; and
determine the target search result set by subtracting the third search result set from the first search result set.

14. The server of claim 9, wherein the at least one processor is further configured to:
send alarm information to a designated mailbox, when the conversion rate of the target search result set is less than or equal to the first preset threshold and the number of search results of the target search result set is less than a third preset threshold, wherein the alarm information comprises the target search term.

15. The server of claim 9, wherein the preset display contents further comprise at least an application icon, a version number, the number of downloads, or an overview of each search result.

16. The server of claim 9, wherein the conversion rate of the target search result set is an average conversion rate or a maximum conversion rate of first K search results of the target search result set, wherein K is a positive integer.

17. A non-transitory computer readable storage medium storing a computer program which, when executed by a processor, causes the processor to:
   receive a search request from a mobile terminal, wherein the search request comprises a target search term;
   search for a target search result set from a preset application library according to the target search term;
   select, from the target search result set, P search results each having a conversion rate greater than a second threshold value, when the target search result set has a conversion rate greater than a first threshold value, wherein P is a positive integer;
   acquire a download record of a user corresponding to the mobile terminal;
   determine, according to the download record, preference of the user for application types to obtain Q preference values, to determine, for each of the P search results, a score according to the Q preference values and the conversion rate of each of the P search results, to obtain P scores, and to determine, for the P search results, a display order according to the P scores; and
   push the display order and the P search results to the mobile terminal and instruct the mobile terminal to display the P search results, wherein the P search results are displayed with preset display contents and the display order, and wherein the preset display contents at least comprise a conversion rate.

18. The non-transitory computer readable storage medium of claim 17, wherein the computer program executed by the processor to search for the target search result set from the preset application library according to the target search term is executed by the processor to:
   determine associated terms corresponding to the target search term, and obtain a search term set according to the target search term and the associated terms; and
   search for the target search result set from the preset application library according to the search term set.

\* \* \* \* \*